March 10, 1925.  P. MASSON  1,529,493

PLOW

Filed Sept. 30, 1922

INVENTOR
Paul Masson
John A. Naismith
BY
ATTORNEY

Patented Mar. 10, 1925.

1,529,493

UNITED STATES PATENT OFFICE.

PAUL MASSON, OF SAN JOSE, CALIFORNIA.

PLOW.

Application filed September 30, 1922. Serial No. 591,616.

*To all whom it may concern:*

Be it known that I, PAUL MASSON, a citizen of the United States, and resident of San Jose, in the county of Santa Clara and State of California, have invented certain new and useful Improvements in Plows, of which the following is a specification.

In plowing an orchard it is desirable to plow so closely to the rows of trees that some method must be used to throw the plow out of the soil when a tree is reached in order to prevent injury to the tree and perhaps also injury to the plow and temporary stalling of the same.

It is an object of my invention to provide a structure wherein the plow share is automatically removed from the ground and thrown clear of the tree as it approaches the same.

It is a further object of my invention to provide a structure of the character indicated wherein the plow share is automatically thrown clear of the tree as it approaches the same without throwing the gauge wheel out of its path of travel.

It is a still further object of my invention to provide a structure of the character indicated wherein the plow share is guided to the surface of the ground by a twisting movement applied to one portion of the plow beam through engagement with an obstacle such as a tree trunk or vine without communicating the twisting movement to the forward portion of the plow beam carrying the clevis and gauge wheel.

Further objects and advantages will be made apparent in the following description and in the drawing, in which,—

Figure 1:
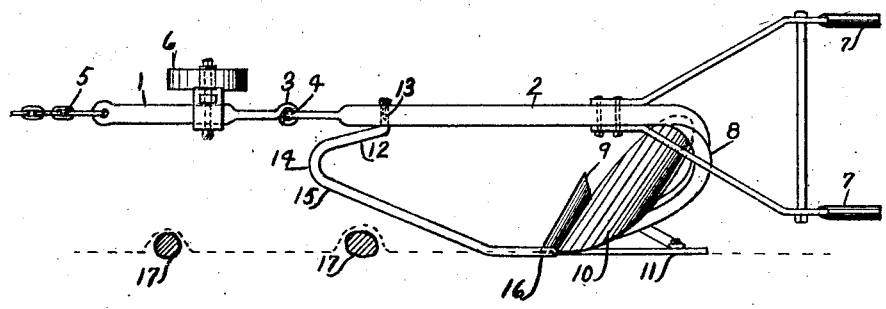
Figure 1 is a plan view of a plow embodying my invention.
Figure 2:
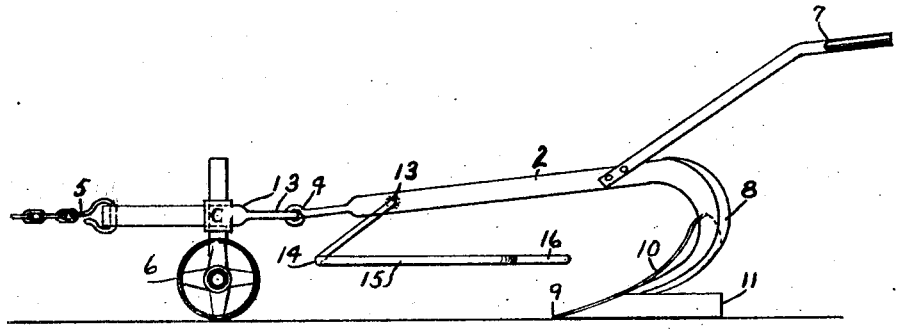
Figure 2 is a side elevation of the plow structure shown in Figure 1.

Referring more particularly to the drawing, I show a plow beam formed in two parts as 1 and 2 connected by interlocking eyes as 3 and 4 respectively, whereby one portion as 2 may have a free pivotal movement with relation to the other.

Portion 1 of the plow beam carries clevis 5 and gauge wheel 6. Portion 2 of the plow beam carries handles 7 and is twisted downwardly and outwardly as at 8 and carries the plow share 9, moldboard 10 and landslide 11.

At 12, I show a rod mounted on portion 2 of the plow beam as at 13 at a point adjacent its pivotal connection with portion 1, it being understood that this point of attachment of rod 12 is where a lateral pressure on beam portion 2 will most effectively twist the point of the plow share 9 upwardly so that it will quickly travel to the surface of the ground. In the present instance rod 12 extends forwardly of its point of attachment 13 and in substantially parallel relation to beam portion 2 to a point somewhat in advance of the connection 3—4 and is thence bent outwardly and backwardly upon itself as at 14, portions 12 and 15 lying in separate planes intersecting at the bending point 14. Portion 15 of rod 12 terminates in a portion 16 lying substantially parallel with landslide 11.

In operation, and assuming that the plow is cutting a furrow in line with the trees, its action is as follows. The angular portion 15 of rod 12, being a distance in advance of the plow share, first engages the tree trunk 17. The forward pull on beam 1—2 causes portion 15 to slide along on the trunk thereby exerting a lateral pressure on beam portion 2 at point 13 and forcing the said beam portion 2 sidewise so that the share 9 is tilted upwardly, the angular arrangement of rod portions 12—14 being such as to maintain the rod in contact with the tree trunk during this operation. This movement being continued the plow share cuts its way to the surface of the ground and rides past the tree trunk on the surface of the ground, to be again inserted in the ground after the tree is passed. To make this section positive the portion 16 of rod 12 is carried backwardly to a point adjacent the plow share 9.

By providing the pivotal joint 3—4 this twisting movement of beam portion 2 is not communicated to beam portion 1, therefore the portion 1 and the gauge wheel carried thereby are not thrown out of their normal path of travel thus enabling the plow to be quickly adjusted to cut the next portion of the furrow and relieving the horses or other source of power of unnecessary and unusual strains besides adding materially to the effective life of the structure, and materially reducing the labor of the plow operator.

It is to be understood, of course, that while I have herein shown and described one specific embodiment of my invention, changes in form, proportions and details of construction may be made within the scope of the appended claims.

I claim:—

1. In a plow, a two-part plow beam, having a universal joint inserted therein a plow share carried by one part of said beam, an obstacle engaging element mounted upon said part at a point adjacent to said universal joint, said means comprising a rod extending forwardly from its point of attachment to said beam to a point adjacent the forward portion of said beam, and thence outwardly and backwardly to a point adjacent said plow share.

2. In a plow, a two-part plow beam, having a universal joint inserted therein a plow share carried by one part of said beam, and obstacle engaging means mounted upon said part at a point adjacent to said universal joint, said means comprising a rod extending forwardly from its point of attachment to said beam to a point adjacent the forward portion of said beam, and thence outwardly and backwardly and downwardly to a point adjacent said plow share.

PAUL MASSON.